(12) United States Patent
Miller et al.

(10) Patent No.: US 7,641,771 B1
(45) Date of Patent: * Jan. 5, 2010

(54) PRESSURE DESALINATION

(76) Inventors: Joel Vance Miller, 5158 Moccasin Way, Antioch, CA (US) 94531; Robert Samuel Smith, 1263 Emory St., San Jose, CA (US) 95126

( * ) Notice: Subject to any disclaimer, the term of this patent is extended or adjusted under 35 U.S.C. 154(b) by 0 days.

This patent is subject to a terminal disclaimer.

(21) Appl. No.: 12/214,140

(22) Filed: Jun. 17, 2008

Related U.S. Application Data (63) Continuation-in-part of application No. 12/154,177, filed on May 20, 2008.

(51) Int. Cl.
*B01D 1/22* (2006.01)
*B01D 3/10* (2006.01)
*B01D 3/42* (2006.01)
*C02F 1/04* (2006.01)

(52) U.S. Cl. .............. 202/181; 137/391; 137/393; 159/44; 159/DIG. 16; 159/DIG. 40; 202/205; 203/1; 203/11; 203/91

(58) Field of Classification Search .............. 137/391, 137/393, 565.23; 159/14, 13.2, 43.1, 44, 159/DIG. 16, DIG. 40; 202/160, 181, 193, 202/196, 205, 236; 203/1, 2, 10, 11, 89, 203/91, DIG. 17
See application file for complete search history.

(56) References Cited

U.S. PATENT DOCUMENTS

| | | | | |
|---|---|---|---|---|
| 3,801,284 A | * | 4/1974 | Meckler | 422/199 |
| 3,860,492 A | * | 1/1975 | Lowi et al. | 202/236 |
| 3,956,072 A | * | 5/1976 | Huse | 202/177 |
| 4,478,685 A | * | 10/1984 | Mortenson | 202/158 |
| 5,242,548 A | * | 9/1993 | Youngner | 202/185.1 |
| 5,534,118 A | * | 7/1996 | McCutchen | 202/205 |
| 5,968,312 A | * | 10/1999 | Sephton | 159/47.1 |

* cited by examiner

*Primary Examiner*—Virginia Manoharan
(74) *Attorney, Agent, or Firm*—Robert Samuel Smith (57) ABSTRACT

A system for generating purified water from polluted water which includes an entry chamber communicating with a source of polluted water, a pump for delivering water vapor from the entry chamber to the vapor chamber, and a passageway for delivering condensed water from the vapor chamber to a reservoir of purified water.

3 Claims, 6 Drawing Sheets

PRESSURE DESALINATION

CROSS REFERENCE TO EARLIER FILED APPLICATION

This application is a continuation-in-part application to application Ser. No. 12/154,177 filed May 20, 2008

FIELD OF THE INVENTION

This invention relates to desalination of salt water and particularly to water desalinated by a pressurized phase change.

BACKGROUND AND INFORMATION DISCLOSURE

A number of technologies have been investigated in the search to develop an economical method for desalinating water to satisfy the demand for fresh water.

For example, U.S. Pat. No. 6,695,951 to Bitterly et al discloses a series of rotating thin concentric shells which rotate at high velocity. Contaminated liquid is injected onto the surface of the shells. Centrifugal force causes the liquid to form a thin film along the inward-facing surface of the shell. A compressor lowers the pressure adjacent the thin film causing the liquid to boil. The compressor carries the vapor to the other side of the shells at a slightly higher temperature. There the vapor encounters the wall which is cooler because the heat was transferred to boil the contaminated liquid the vapor condenses and rotation throws the condensate against the adjacent wall where it is collected. Heat of condensation is transferred to the shell for boiling contaminated liquid.

This disclosure is characterized by a requirement for large kinetic energy of rotation that is necessary to sustain the process.

U.S. Pat. No. 6,699,369 discloses an apparatus that atomizes seawater using non-pneumatic nozzles. The seawater spray stream is directed into an evaporation chamber air, heated by waste heat is directed. The resultant micro-droplets undergo rapid evaporation resulting in the separation of salt solids from the vapor phase of the water. The mixture of suspended solids and water is filtered to remove and collect the salts. Water vapor is condensed to collect salt free water.

This system is characterized by a requirement to dissipate unused energy of condensation.

U.S. Pat. No. 6,833,056 discloses an apparatus including a heat exchanger cooperating with an evaporation can so as to subject raw water in the evaporation can to heat exchange and thereby generate water vapor in the evaporation can. A condenser cooperates with a raw water tank to receive water vapor from an evaporator can. Subjecting water vapor cools the water vapor and raw water in the raw water tank to heat exchange and thereby obtain distilled water.

In other widely used processes, reverse osmosis has gained the majority market share because of its superior cost performance.

Water produced by reverse osmosis remains an expensive process compared to natural water so the search goes on to satisfy an ever-growing demand.

Several types of reverse osmosis have been disclosed and are on the market. The popular commercial systems of choice (as judged in terms of market share) uses TEFLON™ as the membrane material for the reverse osmosis process. The membranes are manufactured by U.S.FILTERS, Inc.

The reverse osmosis systems are expensive to maintain and require up to 800 pounds per square inch to operate. These membranes last only a period of about seven years.

Furthermore, the toxic bacteria that builds up cannot be conveniently cleaned from the TEFLON membrane because the Teflon is degraded by cleansing compounds containing chlorine.

The transport of fluids (liquid and/or gas) relies heavily on the pump art.

Vapor displacement pumps are well known in the art of pumps as a class of pump that causes a fluid to move by trapping a fixed amount of fluid and then forcing (displacing) that trapped volume into the discharge pipe. Positive displacement pumps can be further classified as either rotary-type (for example the rotary vane) or lobe pumps similar to oil pumps used in car engines. Another common type is the Wendelkolben pump or the helical twisted Roots pump. The low pulsation rate and gentle performance of this Roots-type positive displacement pump is achieved due to a combination of its two 90° helical twisted rotors, and a triangular shaped sealing line configuration, both at the point of suction and at the point of discharge. This design produces a continuous and non-vorticule flow with equal volume. High capacity industrial "air compressors" have been designed to employ this principle as well as most "superchargers" used on internal combustion engines.

Reciprocating-type pumps use a piston and cylinder arrangement with suction and discharge valves integrated into the pump. Pumps in this category range from having "simplex" one cylinder, to in some cases "quad" four cylinders or more. Most reciprocating-type pumps are "duplex" (two) or "triplex" (three) cylinder. Furthermore, they are either "single acting" independent suction and discharge strokes or "double acting" suction and discharge in both directions. The pumps can be powered by air, steam or through a belt drive from an engine or motor. This type of pump was used extensively in the early days of steam propulsion (19th century) as boiler feed water pumps.

SUMMARY OF THE INVENTION

It is an object of this invention to provide an apparatus for desalinating water that is economical compared to competing systems.

It is also an object that the desalination process is amenable to producing desalinated water at a large rate.

This invention is directed toward an evacuated enclosure containing a system for admitting polluted water into an entry chamber of the system, a means for facilitating the withdrawal of water vapor from the polluted water entering the chamber. The entry chamber has one wall being a so-called barrier wall of the entry chamber inclined to horizontal. The polluted water flows as a film down the barrier wall forming an inside surface of the chamber. The vapor is flows from the entry chamber into a vapor chamber then through a passageway. A portion of the surface of the passageway is the reverse side of the barrier wall (opposite the cascading water). so that heat of evaporation in the entry chamber on one side of the barrier wall is drawn as heat of condensation of vapor condensing as it passes through the passageway. The condensed (pure) water and any remaining vapor continues to be drawn by a pump at the exit end of the passageway where the condensed water is collected.

DISCUSSION OF THE DRAWINGS

Figure 1:
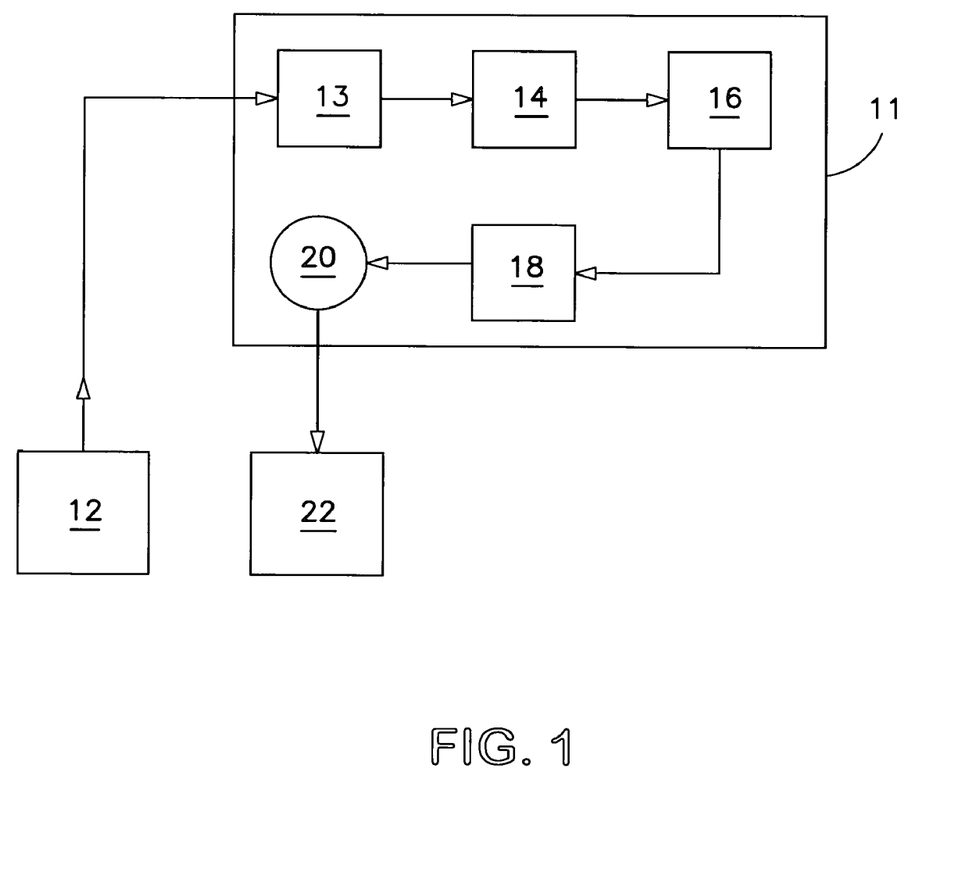
FIG. 1 is a schematic diagram of the system

Turning now to a discussion of the drawings, FIG. 1 is a schematic diagram of an enclosed system 10 for generating purified water from a source 12 of polluted water. and delivering pure water to a reservoir 22.

There are shown:

an air-tight enclosure 11 enclosing the entire system 10;

a source of polluted water 12;

a valve arrangement 13 for admitting polluted water from source 12 or re-circulating drainage water.

entry chamber 14 where vapor is generated;

a vapor collection chamber 16 where vapor is collected;

A passageway 18 where the vapor condenses;

A pump 20 for generating a vacuum in the system to draw the current of water vapor and purified water from the entry chamber through the passageways 18 and deliver the purified water to a collection tank 22.

Figure 2A:
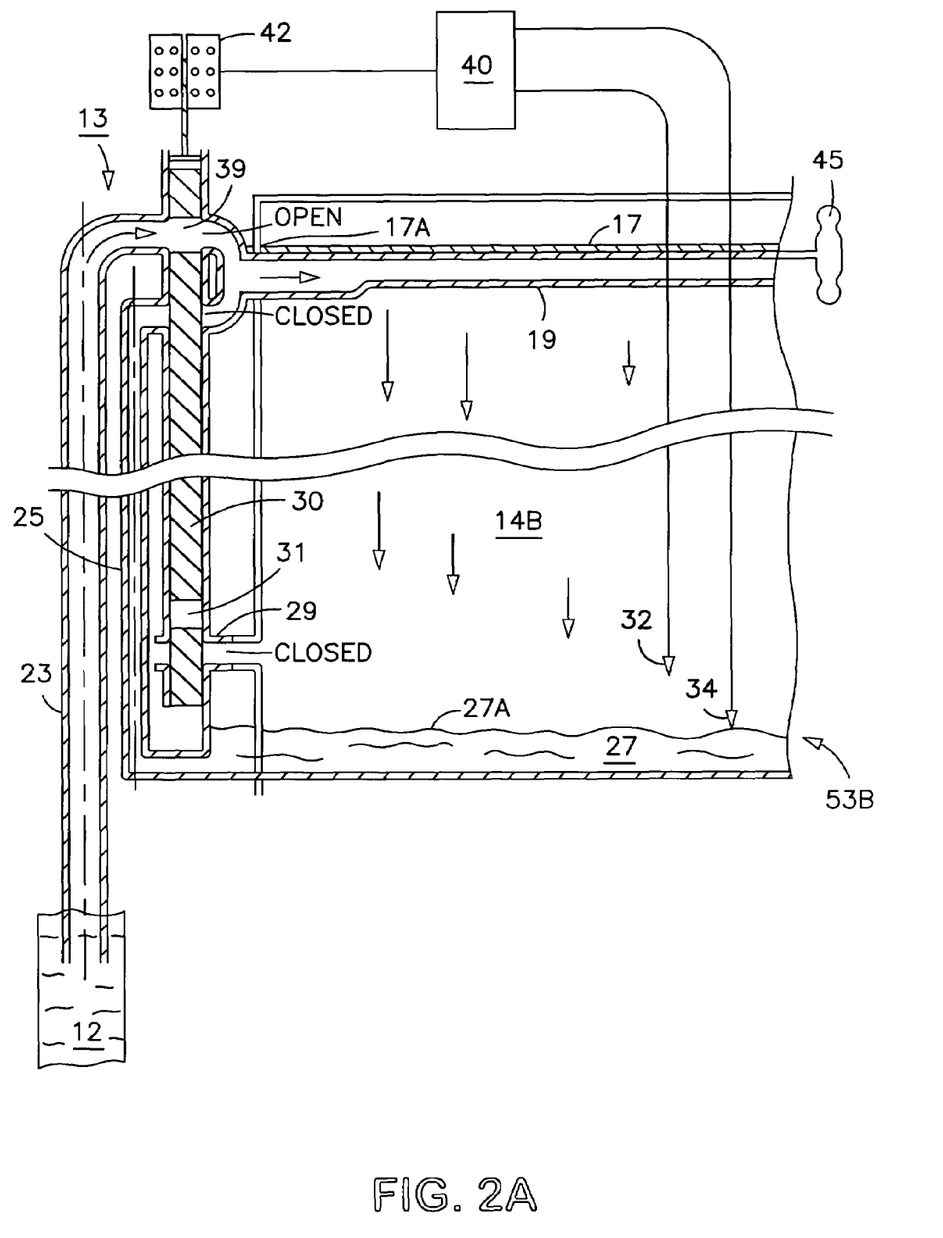
FIGS. 2A,B show the conduit configuration leading to the barrier panel for generating water vapor inside an entry chamber.
Figure 2B:
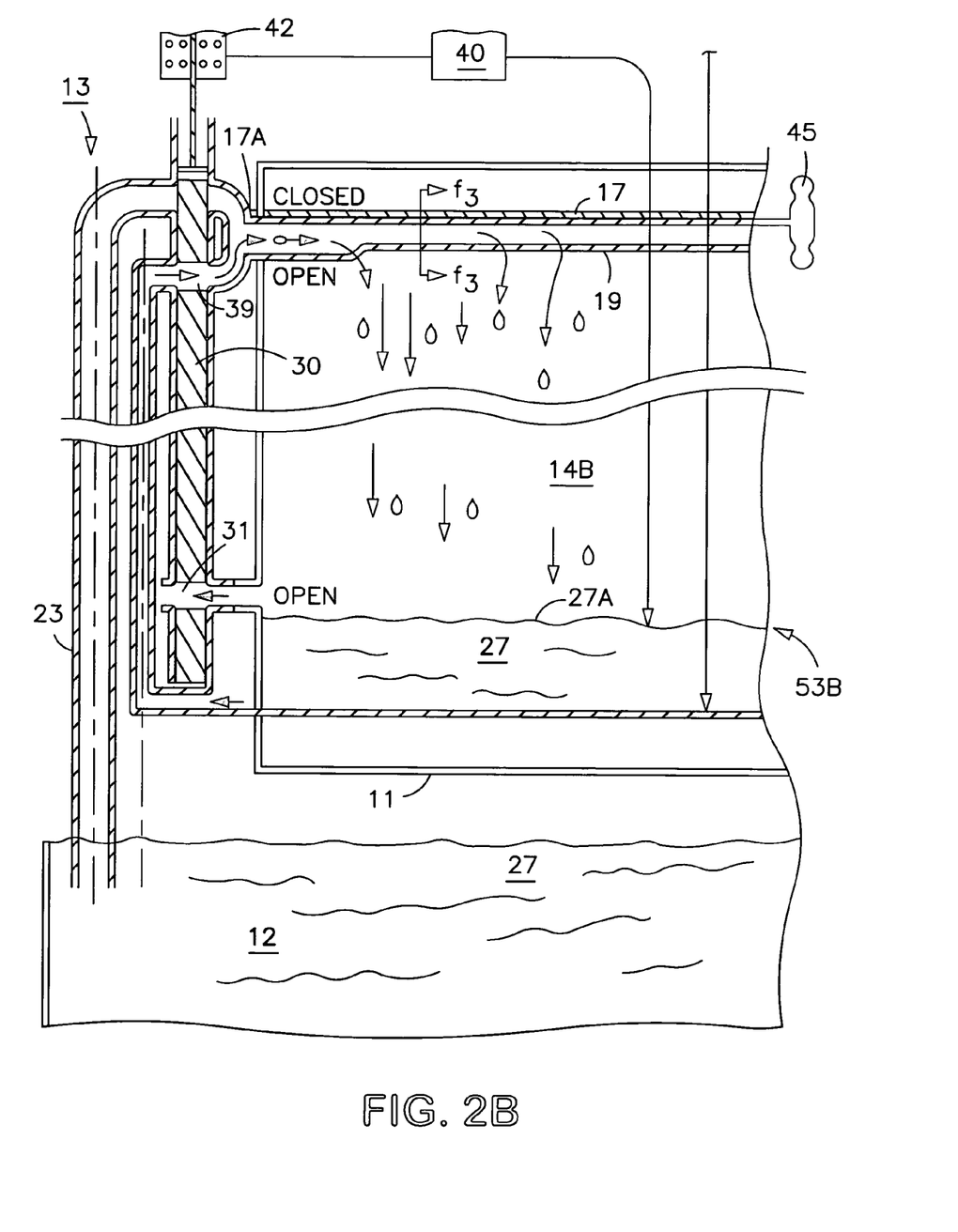

FIG. 2A, B are perspective schematic views showing details of the valve 13 for controlling flow from source 12 to entry chamber 14.

The entry chamber 14 includes two parallel panels spaced close together. Only one panel 14B is shown in FIGS. 2A, B.

The valve is a valve plate 30 with openings 39 and 37. The valve plate 30 intersects three conduits—source conduit 23, and drain conduit 25, and air escape conduit 29.

Source conduit 23 delivers polluted water from source 12 to the top of the barrier wall 14B of entry chamber 14 when valve plate opening 39 in valve plate 13 is positioned so that source conduit 23 is aligned with opening 39 in valve plate 30 and valve plate 30 is positioned so that drain conduit 25 and air escape conduit 29 and drain conduit 25 are closed as shown in FIG. 2A.

This arrangement provides that when valve plate 30 is in one position (FIG. 2A) the valve plate 30 blocks flow through the air release conduit and blocks flow through the drain conduit and opening 39 is positioned to where source conduit 23 is unblocked permitting polluted water to flow from the reservoir 12 of polluted water to the top of entry chamber 14.

Drain conduit 25 delivers drain water from the bottom 27 of entry chamber 14 to the top of barrier wall 14B when valve plate 13 is positioned so that source conduit 23 is closed and an air escape conduit 29 and drain conduit 25 are open as shown in FIG. 2B Water controlled by valve 13 flows into one end of horizontal tube 17 positioned at the top edge of barrier wall 14B inside entry chamber 14.

Figure 3:
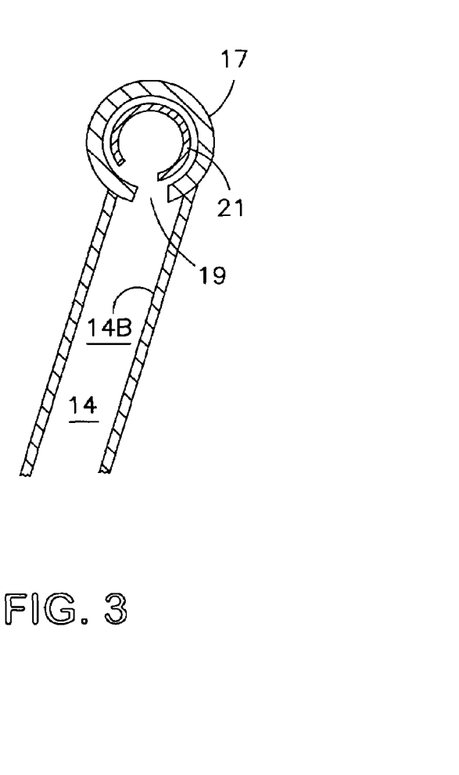
FIG. 3 shows the slotted tube to control flow of water into the entry chamber.

Referring to sectional view FIG. 3, the tube 17 has an elongated opening (19) (either a row of holes or a slot) extending along the length of tube 17, Polluted water passing through slot 19 flows down over the barrier wall FIGS. 2A,B and sectional view 3 show a manual means for controlling the rate of flow through slot 19.

FIG. 3 shows a positionable slide 21 telescoped inside the tube 17 The slide 21 is arranged for controlling the size of the slot being a slotted internal sleeve telescoped inside tube 17. In order to control the size of the slot, the slide 21 is coupled externally to a handle 45 which is a means for controlling rotational position of the slide. The size (width) of the slot 19 is selected by manual rotation of the handle 45

As shown in FIGS. 2A,B, one end of 17A of the tube 17 communicates with the valve 13 which admits polluted water from source 12 or recycles polluted water that has drained to the bottom 27 of the entry chamber 14. When the (air) pressure in the entry chamber 14 is reduced, water from either source (12 or 27) flows through the tube 17 and out of slot 19 and cascades as a film down the inside surface of "so-called" barrier wall 10B of entry chamber 14.

The flow of water cascading down the barrier wall 14B is controlled by the degree of vacuum in the entry chamber and by the position of valve plate 30 of valve 13 and by the variable width of the slot 13.

FIGS. 3A, B show additional structure for controlling the level of water in the entry chamber 14 by shifting valve plate 30 between a first (high) level and a second (low) level.

Figure 4:
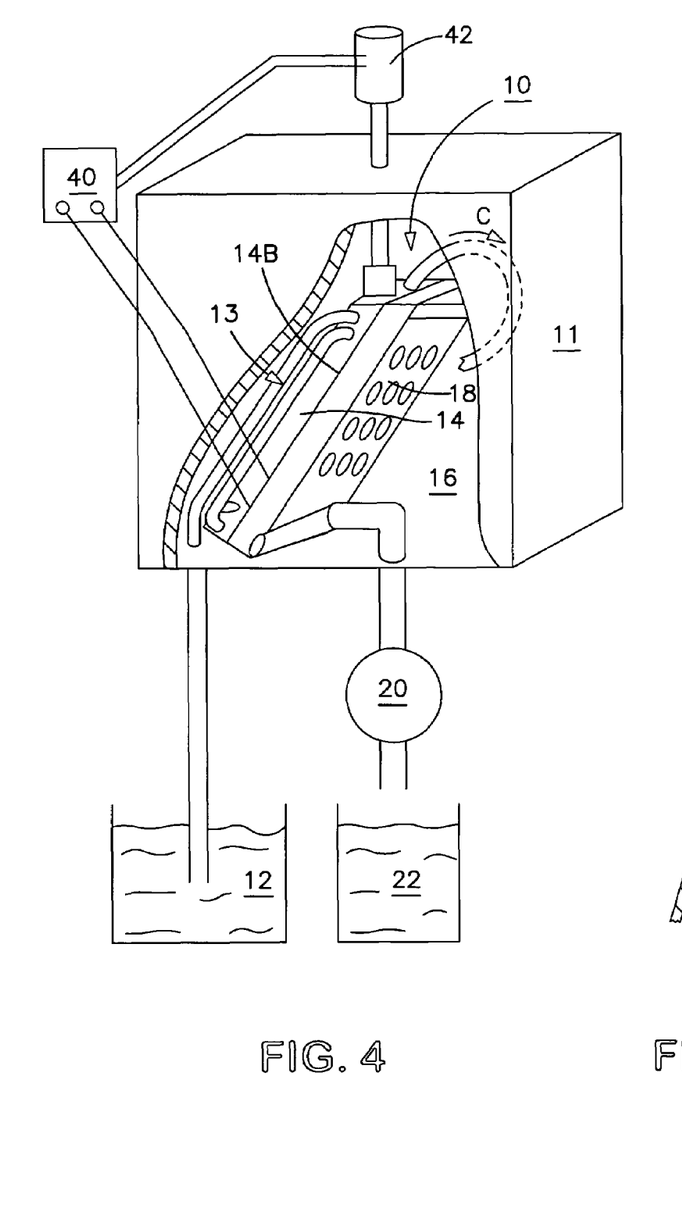
FIG. 4 is an assembly view of the system showing the array of passages

The additional structure for locating the plate in either of the first and second position comprises:

a first level sensor 32 positioned at a highest level where sensor 32 generates a high level signal when the level of polluted water in entry chamber 14 reaches a (pre-selected) high level;

a second level sensor 34 positioned to where the second level sensor 34 generates a low level signal when a level of the polluted water in entry chamber 14 reaches a pre-selected low level;

a signal detector 40, connected to detectors 32 and 34, that send a high/low level signal to a solenoid 42;

Solenoid 42, coupled to plate 30, slides plate 30 to the first position when the water level, in the entry chamber, drops to the selected low level and slides plate 30 to the second position when the water level, near a bottom of the entry chamber, rises to a selected high level;

FIG. 4 is an assembly view of the system cutaway to show the entry chamber 14, the conduits 23, 25, 29 discussed with reference to FIGS. 2A,B and the position of the passageways relative to the entry chamber 14 and the vapor collection chamber 15 and the vapor collection chamber 16.

The edge of the barrier wall 14B is shown, on one side of which are the passageways 18 and on the side of which is the entry chamber 14.

As shown in FIG. 4, the array (stack) of passageways 18 is positioned between the entry chamber 14 and the vapor collection chamber 16 in order that heat of condensation generated by condensation in the passageways 18 be delivered as heat of evaporation to the water running down the barrier surface 14B in the entry chamber 14.

Figure 5A:
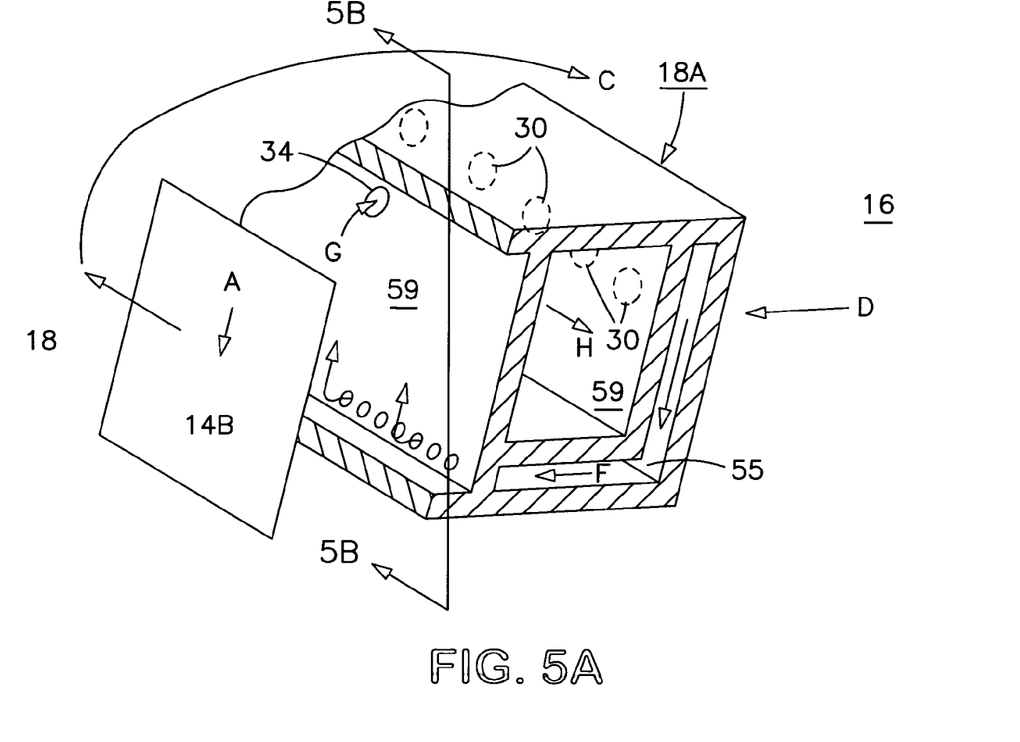
FIG. 5 shows a cutaway view of a single passageway.
Figure 5B:
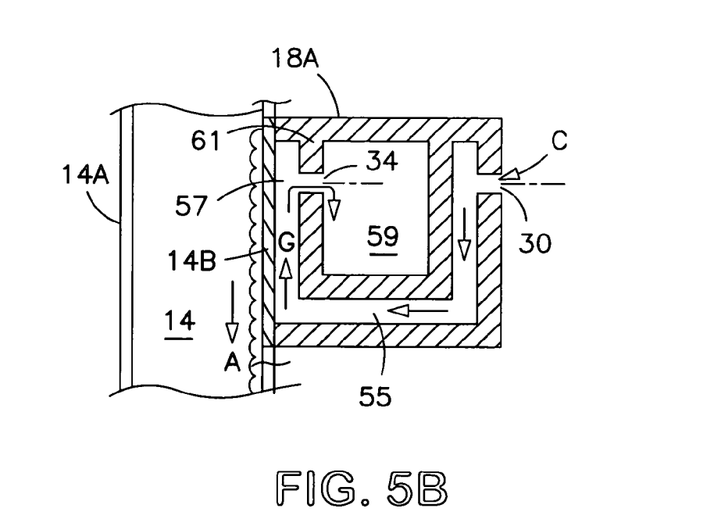

FIGS. 5A, B show details of a single passageway 18A. The arrows indicate the path of the fluid (water and vapor) through the passageway 18A into the conduit 59 leading to the reservoir 22 of pure water. (Reservoir 22 is not shown in FIGS. 5A, B.) The barrier wall 14B between the entry chamber 14 and passageway 18 is shown detach in FIG. 5A for clarity purposes.

Arrow A represents the flow of water down the face 14B of the barrier panel.

Arrow C represents the flow of vapor from the entry chamber 14 into the vapor chamber 16.

Arrow D represents flow from the vapor chamber 16 through orifices 30 (shown in phantom in FIG. 5A)) into the passageway 55.

Arrows E, F represent flow through the passage way 55.

Arrow G represents flow of vapor through passageway section 57 where strong condensation occurs because of the cooling effect of evaporation in the entry chamber 14.

As condensed vapor fills passageway section 57, purified water pours through openings 34 into central conduit 22 to the purified water reservoir at the end of central conduit 22. Arrow H represents flow of (condensed) water in central conduit 59 into the reservoir 22 for pure water. Storage reservoir 22 is not shown in FIGS. 5A, B.

Variations and modifications of the invention may be contemplated after reading the specification and studying the drawings which are within the scope of the invention.

For example, the barrier wall 14D is selected to have a large heat conductivity such as copper.

In various embodiments, the enclosure enclosing the system is one of concrete, metal, concrete reinforced by metal reinforcing bars, metal net.

In another embodiment, the pump is a displacement pump.

Figure 6:
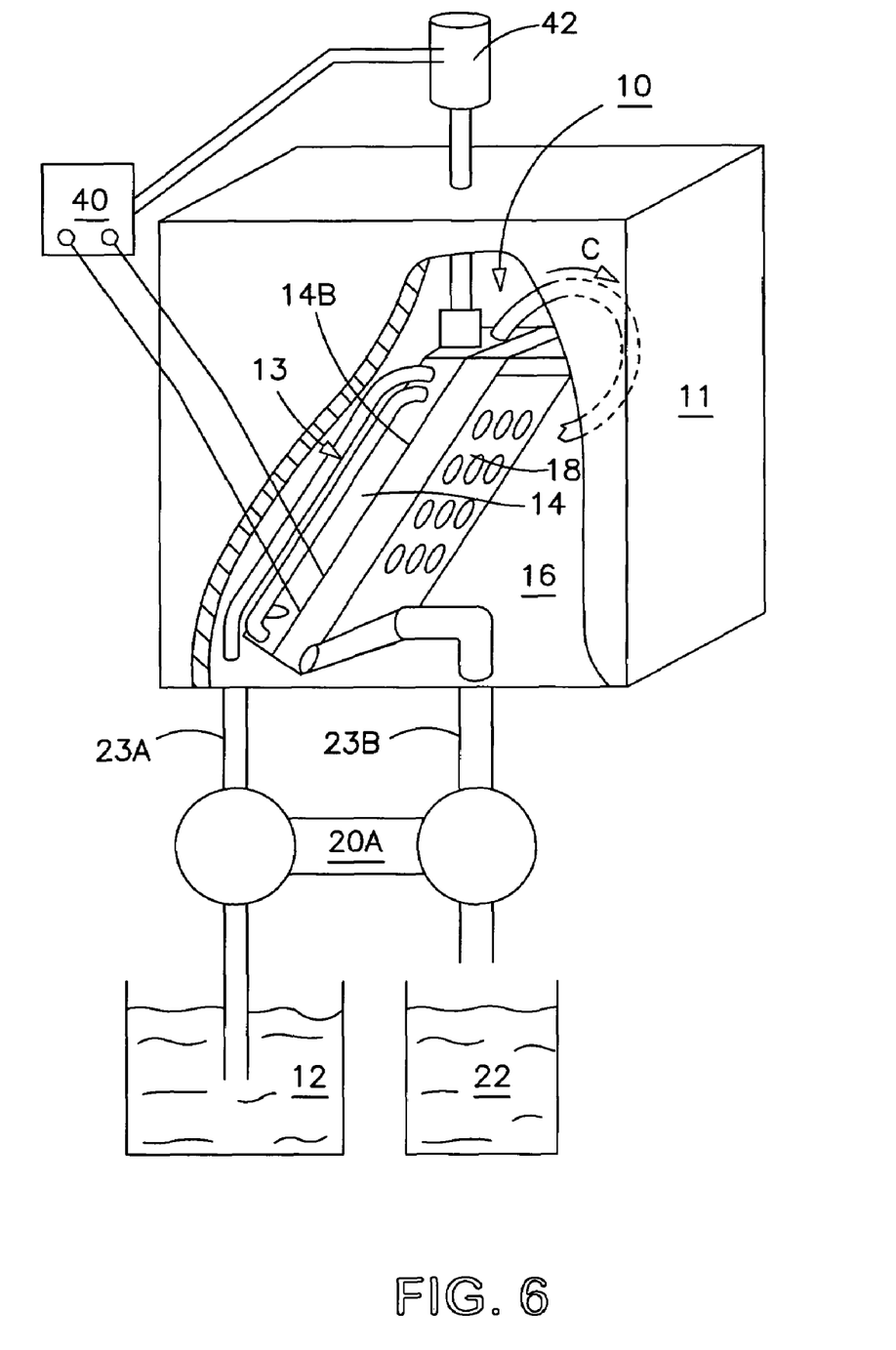
FIG. 6 shows a displacement pump for equalizing input and out put of water

FIG. 6 shows a displacement pump that evacuates the whole system and is coupled to the source conduit 23A and 23B that equalizes input of polluted water to output of pure water and vapor.

Another embodiment comprises a temperature sensor that measures the temperature difference between said incoming polluted water and said outgoing pure water and controls the rate of flow of polluted water according to the temperature of difference.

In view of these and other modifications that are within the spirit of the invention, it is therefore wished to define the invention by the appended claims.

What is claimed is:

1. A system for converting polluted water from a reservoir for polluted water to purified water and delivering said purified water to a reservoir for purified water, said system comprising:
   a conduit means for drawing polluted water from said reservoir of polluted water;
   an entry chamber having an entry port communicating with said conduit means;
   a vapor chamber communicating with said entry chamber;
   a passageway having an entrance communicating with said vapor chamber;
   a pump having an input communicating with said passageway and an output arranged for delivering purified water to said reservoir for pure water;
   an air-tight enclosure enclosing said entry chamber, vapor collection chamber, passageway and pump; and
   said system arranged to provide that said pump reduces air pressure in said entry chamber, vapor collection chamber and passageway thereby drawing polluted water from said reservoir of polluted water, and draws water vapor from said polluted water in said entry chamber, collects said vapor in said vapor collection chamber, condenses said vapor to purified water in said passageway, and discharges said pure water into said reservoir for purified water;
   a section of wall of said entry chamber being a barrier wall, bounding said entry chamber on one side of said barrier wall, and bounding said passageway on another side of said barrier wall;
   said barrier wall positioned inclined to horizontal;
   means for directing said polluted water to flow from a top boundary of said entry chamber inside said entry chamber down an inclined surface of said barrier wall providing that water vapor abetted by reduced air pressure, is generated from water flowing down said inclined surface in said entry chamber;
   said pump drawing said vapor through said vapor collection chamber then into said passageway where condensation of said vapor generates purified water;
   said purified water flowing through said pump to said reservoir for purified water;
   a valve means for controlling flow of polluted water from said conduit means into said entry chamber; and
   said conduit means comprises:
      a source conduit leading from said reservoir of polluted water to said valve means;
      a drain conduit leading from near a bottom of said entry chamber to said valve means;
      an air-release conduit leading from a limit level near said bottom of said entry chamber to environment outside said system; and
   said valve means comprises:
      a slideable plate intersecting said source conduit, said drain conduit and said air-release conduit;
      said plate having a first opening and a second opening and a third opening;
      said openings arranged to provide that: when said plate is in one position, said plate blocks flow through said air release conduit and blocks flow through said drain conduit and said first opening is positioned to where said source conduit is unblocked permitting polluted water to flow from said reservoir of polluted water to said entry chamber; and
   when said plate is in a second position:, said source opening is
      blocked and second and third openings are positioned to where said air-release conduit and said drain conduit are open providing that polluted water that has drained into the bottom of said entry chamber is admitted back into said top of said entry chamber;
   means for locating said plate in anyone of said first and second position.

2. The system of claim 1 wherein said means for locating said plate in any one of said first and second position comprises:
   a first level sensor positioned to where said first level sensor generates a high level signal when a level of said polluted water in said entry chamber reaches a high level;
   a second level sensor positioned to where said second level sensor generates a low level signal when a level of said polluted water in said entry chamber reaches a low level;
   a solenoid coupled to said sensors and arranged to slide said plate to said first position when said water level in a bottom of said entry chamber drops to a selected low level and said solenoid arranged to slide said plate to said second position when said water level near a bottom of said entry chamber rises to a selected high level;

said solenoid coupled to said plate arranged to slide said plate to said first and second positions responsive to said high and low levels.

3. The system of claim 1 comprising:

a tube having an elongated slot positioned parallel to and along said top boundary of said barrier surface;

means for controlling a width of said slot;

one end of said tube communicating with said valve means providing that rate of flow of said polluted water down a surface of said barrier wall is controlled by said means for controlling a width of said slot;

a positionable slide inside said tube arranged for controlling a size of said slot;

means for controlling position of said slide permitting control of said size of said slot.

* * * * *